US007494734B2

United States Patent
Lee et al.

(10) Patent No.: US 7,494,734 B2
(45) Date of Patent: Feb. 24, 2009

(54) CORROSION RESISTANT PLATE FOR PEM FUEL CELL AND METHODS OF MAKING SAME

(75) Inventors: James H Lee, Rochester, NY (US); Brian K Brady, North Chili, NY (US); Robert L Fuss, Spencerport, NY (US)

(73) Assignee: General Motors Corporation, Detroit, MI (US)

( * ) Notice: Subject to any disclaimer, the term of this patent is extended or adjusted under 35 U.S.C. 154(b) by 609 days.

(21) Appl. No.: 10/845,904

(22) Filed: May 14, 2004

(65) Prior Publication Data
US 2004/0208989 A1    Oct. 21, 2004

Related U.S. Application Data

(62) Division of application No. 10/310,166, filed on Dec. 4, 2002, now Pat. No. 6,887,613.

(51) Int. Cl.
*H01M 2/02* (2006.01)
*B05D 1/36* (2006.01)
(52) U.S. Cl. .............................. 429/34; 428/38; 428/39; 427/115; 427/407.1
(58) Field of Classification Search .................. 429/34, 429/38; 29/623.5, 623.1; 427/115
See application file for complete search history.

(56) References Cited

U.S. PATENT DOCUMENTS

| | | | |
|---|---|---|---|
| 4,751,062 A | 6/1988 | Kaufman et al. | |
| 5,578,388 A | 11/1996 | Faita et al. | |
| 5,624,769 A * | 4/1997 | Li et al. | 429/32 |
| 5,645,959 A * | 7/1997 | Rowlette | 429/210 |
| 5,776,624 A | 7/1998 | Neutzler | 429/26 |
| 6,051,331 A * | 4/2000 | Spear et al. | 429/34 |
| 6,103,413 A | 8/2000 | Hinton et al. | 429/32 |
| 6,218,089 B1 | 4/2001 | Pierrat | 430/394 |
| RE37,284 E | 7/2001 | Li et al. | |
| 6,350,539 B1 | 2/2002 | Wood, III et al. | |
| 6,372,376 B1 | 4/2002 | Fronk et al. | 429/41 |

FOREIGN PATENT DOCUMENTS

| | | |
|---|---|---|
| EP | 1035608 | 2/2000 |
| EP | 1 160 900 A2 | 12/2001 |
| GB | 2 359 186 | 8/2001 |

OTHER PUBLICATIONS

PCT Search Report in PCT/US03/38031 dated May 19, 2004.
Michael C. Kimble, Alan S. Woodman, and Everett B. Anderson, Physical Sciences, Inc., Andover, MA, Characterization of Corrosion-Protective Methods for Electrically Conductive Coatings on Aluminum, American Electroplaters and Surface Finishers Society, AESF SUR/FIN '99 Proceedings, Jun. 21-24, 1999, pp. 1-12.

* cited by examiner

*Primary Examiner*—Raymond Alejandro

(57) ABSTRACT

A fuel cell or electrochemical cell has a catalytic electrode and an electrically conductive contact element facing the electrode. The electrically conductive contact element conducts electrical current from the electrode and has a surface that includes a plurality of passivated regions and a plurality of non-passivated regions dispersed among the passivated regions. The surface is further coated with an electrically conductive, corrosion resistant coating. Methods include treating the electrically conductive contact element by passivation to resist corrosion while still maintaining electrical conductivity of the element.

7 Claims, 5 Drawing Sheets

US 7,494,734 B2

CORROSION RESISTANT PLATE FOR PEM FUEL CELL AND METHODS OF MAKING SAME

CROSS-REFERENCE TO RELATED APPLICATIONS

This application is a divisional of U.S. patent application Ser. No. 10/310,166 filed on Dec. 4, 2002, which issued as U.S. Pat. No. 6,887,613 on May 3, 2005. The disclosure of the above application is incorporated herein by reference.

FIELD OF THE INVENTION

The present invention relates to PEM fuel cells and, more particularly, to corrosion-resistant separator plates and methods for making the same.

BACKGROUND OF THE INVENTION

Fuel cells have been proposed as a power source for electric vehicles and other applications. One known fuel cell is the PEM (i.e., Proton Exchange Membrane) fuel cell that includes a so-called "membrane-electrode-assembly" comprising a thin, solid polymer membrane-electrolyte having an anode on one face of the membrane-electrolyte and a cathode on the opposite face of the membrane-electrolyte. The anode and cathode typically comprise finely divided carbon particles, very finely divided catalytic particles supported on the internal and external surfaces of the carbon particles, and proton conductive material intermingled with the catalytic and carbon particles.

The membrane-electrode-assembly is sandwiched between a pair of electrically conductive contact elements which serve as current collectors for the anode and cathode, and may contain appropriate channels and openings therein for distributing the fuel cell's gaseous reactants (i.e., $H_2$ & $O_2$/air) over the surfaces of the respective anode and cathode.

Bipolar PEM fuel cells comprise a plurality of the membrane-electrode-assemblies stacked together in electrical series while being separated one from the next by an impermeable, electrically conductive contact element known as a bipolar plate or septum. The septum or bipolar plate has two working faces, one confronting the anode of one cell and the other confronting the cathode on the next adjacent cell in the stack, and bipolar plate electrically conducts current between the adjacent cells. Contact elements at the ends of the stack contact only the end cells and are referred to as end plates.

In an $H_2$—$O_2$/air PEM fuel cell environment, the bipolar plates and other contact elements (e.g., end plates) are in constant contact with highly acidic solutions (pH 3-5) containing $F^-$, $SO_4^{--}$, $SO_3^-$, $HSO_4^-$, $CO_3^{--}$, and $HCO_3^-$, etc. Moreover, the cathode operates in a highly oxidizing environment, being polarized to a maximum of about +1 V (vs. the normal hydrogen electrode) while being exposed to pressurized air. Finally, the anode is constantly exposed to super atmospheric hydrogen. Hence, contact elements made from metal must be resistant to acids, oxidation, and hydrogen embrittlement in the fuel cell environment. As few metals exist that meet this criteria, contact elements have often been fabricated from large pieces of graphite which is corrosion-resistant, and electrically conductive in the PEM fuel cell environment. However, graphite is quite fragile, and quite porous making it extremely difficult to make very thin gas impervious plates therefrom.

Lightweight metals, such as aluminum and its alloys, have also been proposed for use in making fuel cell contact elements. Such metals are more conductive than graphite, and can be formed into very thin plates. Unfortunately, such light weight metals are susceptible to corrosion in the hostile PEM fuel cell environment, and contact elements made therefrom either dissolve (e.g., in the case of aluminum) that increases the internal resistance of the fuel cell and reduces its performance.

In light of the corrosion sensitivity of lightweight metals, such as aluminum, efforts have been made to develop protective coatings. However, some of these protection methods increase the electrical resistance of the aluminum plate to unacceptable levels. Other methods of protection keep the conductivity at an acceptable level, but do not sufficiently achieve the desired level of protection.

Accordingly, there is a need for conductive bipolar plate which is corrosion resistant and electrically conductive to promote power output and efficiency of the fuel cell.

SUMMARY OF THE INVENTION

The present invention provides an electrochemical cell having a catalytic electrode and an electrically conductive contact element that faces the electrode, where the electrically conductive contact element conducts electrical current from the electrode, and the electrically conductive contact element has a surface with a plurality of passivated and non-passivated regions, where the non-passivated regions are dispersed among the passivated regions, and an electrically conductive, corrosion resistant coating is applied over the surface.

Another aspect of the present invention includes methods for treating the electrically conductive contact element to provide corrosion resistance while still enabling electrical conductivity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention contemplates a separator plate in an electrochemical fuel cell (e.g. a bipolar plate in a fuel cell stack) that uses a lightweight conductive material treated to resist corrosion, which dramatically increases the fuel cell efficiency and lengthens its lifespan. First, to better understand the present invention, a description of an exemplary fuel cell and stack are provided herein.

Figure 1:
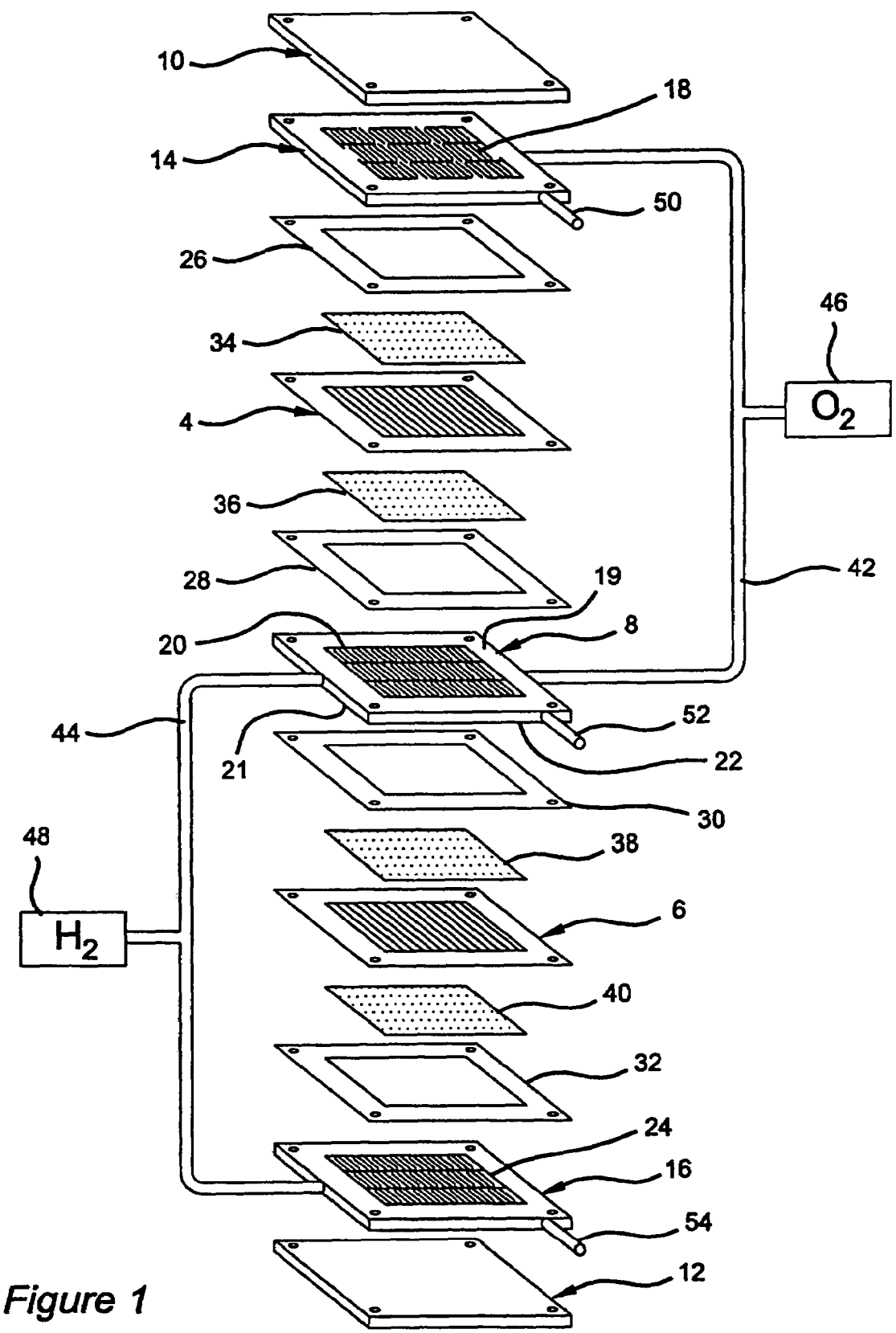
FIG. 1 is a schematic illustration of two cells in a liquid-cooled PEM fuel cell stack.

FIG. 1 depicts two individual proton exchange membrane (PEM) fuel cells connected to form a stack having a pair of membrane-electrode-assemblies (MEAS) 4 and 6 separated from each other by an electrically conductive, liquid-cooled, bipolar separator plate 8. An individual fuel cell, which is not connected in series within a stack, has a separator plate 8 with a single electrically active side. In a stack, a preferred bipolar separator plate 8 typically has two electrically active sides 19, 21 within the stack, each active side 19, 21 respectively facing a separate MEA 4, 6 with opposite charges that are separated, hence the so-called "bipolar" plate. As described herein, the fuel cell stack is described as having conductive bipolar plates, however the present invention is equally applicable to conductive plates within a single fuel cell.

The MEAs 4 and 6, and bipolar plate 8, are stacked together between stainless steel clamping plates 10 and 12, and end contact elements 14 and 16. The end contact elements 14 and 16, as well as both working faces of the bipolar plate 8, contain a plurality of grooves or channels 18, 20, 22, and 24 for distributing fuel and oxidant gases (i.e., $H_2$ & $O_2$) to the MEAs 4 and 6. Nonconductive gaskets or seals 26, 28, 30, and 32 provide seals and electrical insulation between the several components of the fuel cell stack. Gas-permeable conductive diffusion media 34, 36, 38 and 40 press up against the electrode faces of the MEAs 4 and 6. The end contact elements 14 and 16 press up against the diffusion media 34 and 40 respectively, while the bipolar plate 8 presses up against the diffusion media 36 on the anode face of the MEA 4, and against diffusion media 38 on the cathode face of MEA 6.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing (not shown) for both the $H_2$ and $O_2$/air sides of the MEAs will also be provided. Additional plumbing 50, 52, 54 is provided for circulating coolant through the bipolar plate 8 and end plates 14 and 16.

Figure 2:
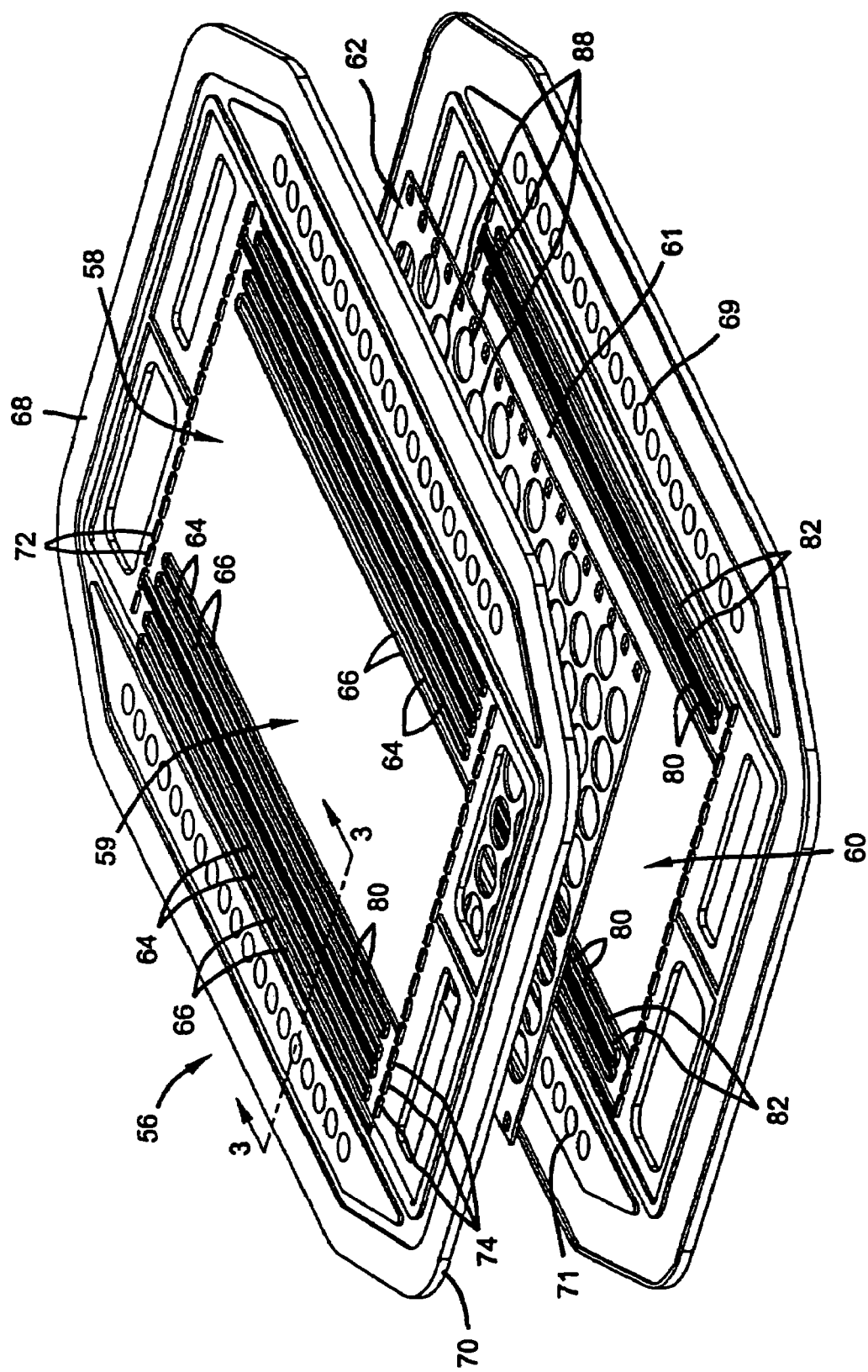
FIG. 2 is an exploded, isometric view of a bipolar plate useful with PEM fuel cell stacks like that illustrated in FIG. 1.

FIG. 2 is an isometric, exploded view of a bipolar plate 56 comprising a first exterior metal sheet 58, a second exterior metal sheet 60, and an interior spacer metal sheet 62 interjacent the first metal sheet 58 and the second metal sheet 60. The exterior metal sheets 58 and 60 are fabricated as thinly as possible (e.g., about 0.002-0.02 inches thick); may be formed by stamping, by photo etching (i.e., through a photolithographic mask) or any other conventional process for shaping sheet metal.

The external sheet 58 has a first working face 59 on the outside thereof which confronts a membrane-electrode-assembly (not shown) and is formed so as to provide a plurality of lands 64 which define therebetween a plurality of grooves 66 known as a "flow field" through which the fuel cell's reactant gases (i.e., $H_2$ or $O_2$) flow in a tortuous path from an inlet side 68 of the bipolar plate to an outlet side 70 thereof. When the fuel cell is fully assembled, the lands 64 press against the diffusion media 36, 38 (FIG. 1) which, in turn, press against the MEAs 4 and 6 respectively. For drafting simplicity, FIG. 2 depicts only two arrays of lands and grooves. In reality, the lands and grooves will cover the entire external faces of the metal sheets 58 and 60 that engage the diffusion media 36 and 38. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell.

Figure 3:
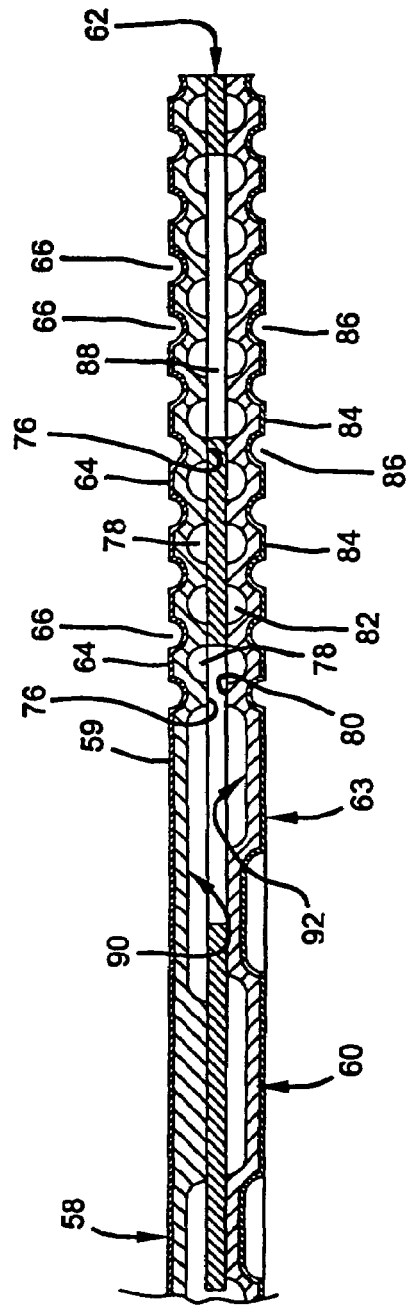
FIG. 3 is a sectioned view in the direction 3-3' of FIG. 2 showing a preferred embodiment of the present invention having a passivation layer and an electrically conductive corrosion resistant layer of polymer.

Metal sheet 60 is similar to sheet 58. The internal face 61 (i.e., coolant side) of sheet 60 is shown in FIG. 2. In this regard, there is depicted a plurality of ridges 80 defining therebetween a plurality of channels 82 through which coolant flows from one side 69 of the bipolar plate to the other 71. Like sheet 58 and as best shown in FIG. 3, which is a cross-sectional view along line 3-3' of FIG. 2, the external side of the sheet 60 has a working face 63 having a plurality of lands 84 thereon defining a plurality of grooves 86 through which the reactant gases pass. An interior metal spacer sheet 62 is positioned interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence which enhances heat exchange with the inside faces 90 and 92 of the exterior sheets 58 and 60 respectively. As appreciated by one of skill in the art, a similar configuration can be used in a single fuel cell conductive plate, which is bounded internally by the MEA and externally by the end plates, where a coolant field may be used along the active face.

Figure 4:
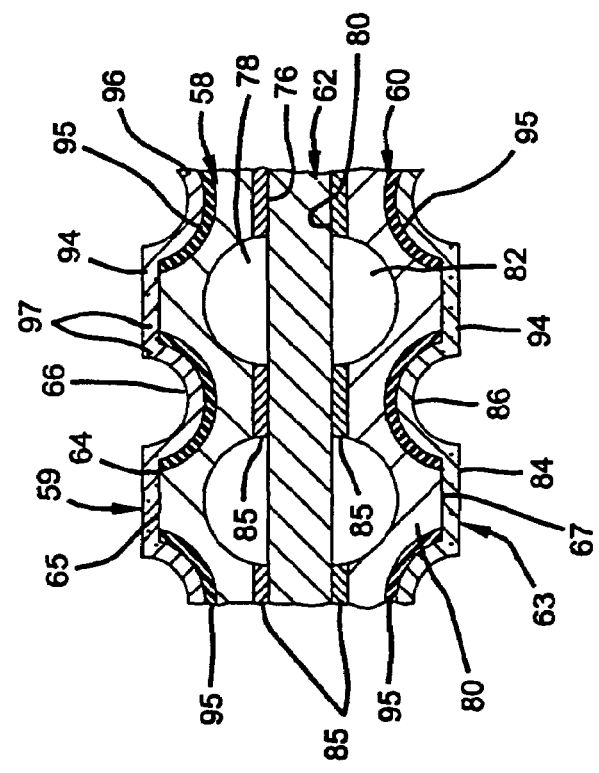
FIG. 4 is a magnified portion of the bipolar plate of FIG. 3.

FIG. 4 is a magnified view of a cross-sectional view along line 3-3' of FIG. 2 and shows the ridges 76 on the first sheet 58, and the ridges 80 on the second sheet 60 bonded (e.g. by brazement 85) to the spacer sheet 62. According to the present invention, the substrate metal forming the contact element sheets 58, 60 comprises a corrosion-susceptible metal such as aluminum. As used herein, corrosion refers to the unintentional and destructive attack of a material, which generally occurs by an electrochemical dissolution. Thus, a corrosion-susceptible material, such as a metal, is subject to degradation within an operating fuel cell environment.

A preferred embodiment of the present invention protects the working faces 59, 63 of the substrate metal of the first or second sheets 58, 60 from both oxidation and acid-attack via a prophylactic coating, as shown in FIG. 4. Substrate surfaces 65, 67 of the working faces 59 and 63 of the first and second sheets 58, 60 are covered with a corrosion-resistant protective coating 94. Corrosion-resistant refers to a material's reduced susceptibility to corrosion including chemical attack mechanisms such as: oxidation (i.e. inadvertent electrochemical reaction), acid attack, or both. "Relatively" corrosion resistant refers to a material's ability to better resist corrosion when compared with other similar materials, resulting in a lower corrosion rates and a longer lifespan.

In accordance with a preferred embodiment of the present invention as shown in FIG. 4, the working faces 59, 63 of the first and second sheets 58, 60 are passivated. Surfaces exposed to a hostile or corrosive environment in the fuel cell are passivated to form a passivation layer 95 on the substrate surfaces 65, 67. As used herein, passivation generally refers to general treatment of a metal to render the surface less chemically reactive and/or electrochemically inactive, thus less susceptible to corrosion. By further clarification, passivation typically refers to a conversion coating which is produced by the reaction of suitable reagents, such as low-solubility oxide, phosphate or chromate compounds that react with the metal surface resulting in a change in the surface properties, including resistance. One preferred passivation process is anodization of an aluminum metal substrate of the first and second sheets 58, 60. Anodization is well known in the art, and generally refers to an electrolytic process where a metal is anodically treated such that a protective oxide film is formed that renders the plate electrochemically inert. By further clarification, anodization typically refers to an electrolytic process that thickens aluminum's natural oxide film, substantially increasing resistance to corrosion. In a preferred embodiment of the present invention, the anodization forms a surface layer of metal oxide, such as aluminum oxide, that is significantly less electrochemically reactive than the base metal, metallic aluminum. Thus, anodized metal is far more resistant to corrosion. Further, the aluminum oxide layer facilitates better adhesion of subsequent applications of coatings. This minimizes potential flaws in the coating, such as pinholes which expose areas of uncoated metal. These pinholes arise as small, unprotected regions of the metallic surface, and have the potential to become growth sites for corrosion. Such sites may further expand at the surface, thus, the passivation layer on the surface minimizes the occurrence of such defects, by increasing adhesion of any subsequently applied layers.

Many different methods of aluminum anodization are well-known in the art. Selecting an anodization process depends on the alloy properties and the protection layer needed for operating conditions in the cell. By way of example, one anodization process uses chromic acid on aluminum to form aluminum oxide and is described in more detail in "Metals Handbook", 8th Edition, Vol. 2, p. 621 (American Society for Metals, 1964). Depending on the anodization method used, the duration of processing to form the passivation layer 95 varies from about five minutes to over 4 hours. The resulting film thickness varies, then, from 5 μm to greater than 700 μm. In an alternate preferred embodiment a chemical conversion coating may be used to passivate the surface of the metal where the metal is converted to a less active species in an oxidation-reduction chemical reaction.

Minimizing the impedance of electrical conductivity in a separator, or bipolar plate is important to maintain the fuel cell power output and efficiency. The electrochemically inert passivation layer may diminish the electrical conductivity of the separator plate within the fuel cell. In a preferred embodiment of the present invention, the passivation layer 95 is removed from electrical contact portions of the bipolar plate 56, i.e. the lands 64 that contact the conductive diffusion media 34, 36, 38, 40 while it substantially covers the remaining portions of the bipolar plate, such as the grooves 66. This re-establishes an electrical contact between the conductive diffusion media 34, 36, 38, 40 and the lands 64 of the bipolar plate 8, reducing any detrimental impact of the electrical resistance of the passivation layer 95 on the functioning of the bipolar plate 56. A preferred removal process includes mechanical or chemical removal or abrasion of the passivation layer 95, however any means of metallic layer removal as known by one of skill in the art will suffice, so long as an electrical contact is reestablished.

In another aspect of a preferred embodiment of the present invention the protective coating 94 comprises a polymeric coating 96, applied to the working surfaces 59, 63 of the first and second plates 58, 60. The polymer of the polymeric coating 96 is selected for its compatibility with the metallic substrate surfaces 65, 67 of the separator bipolar plate 56, as well as for its corrosion-resistance and conductivity. Such a polymer comprises any polymer that is water-insoluable after crosslinking or curing which can form a thin adherent film to the metallic substrate beneath, and that can withstand the hostile oxidative and acidic environment of the fuel cell. Hence, polymers, such as epoxies, silicones, polyamide-imides, polyether-imides, polyphenols, fluoro-elastomers (e.g., polyvinylidene fluoride), polyesters, phenoxy-phenolics, epoxide-phenolics, acrylics, and urethanes, inter alia are seen to be useful with the present invention. Cross-linked polymers are preferred for producing impermeable coatings that provide corrosion-resistant properties.

Applying such a polymeric coating 96 may further minimize any increase in electrical resistivity created by the protective coating 94. Preferably, the polymeric coating 96 is electrically conductive, having a resistivity less than about 50 ohm-cm. Depending on the characteristics of the polymer selected, the polymeric coating 96 may optionally further comprise oxidation-resistant, acid-insoluble, electrically conductive particles 97 (i.e., less than about 50 μm) dispersed throughout an acid-resistant, oxidation-resistant polymer matrix. These conductive particles 97 further reduce the electrical resistivity of the protective coating 94.

The conductive particles 97 are selected from the group consisting of: gold, platinum, graphite, carbon, nickel, conductive metal borides, nitrides and carbides (e.g., titanium nitride, titanium carbide, titanium diboride), titanium alloys containing chromium and/or nickel, palladium, niobium, rhodium, rare earth metals, and other noble metals. Most preferably, the particles 97 will comprise carbon or graphite (i.e., hexagonally crystallized carbon). The particles 97 comprise varying weight percentages of the polymeric coating 96 depending on both the conductive characteristics of the polymer itself (determining the extent of conductivity needed) and further the density and conductivity of the particles 97 (i.e., particles having a high conductivity and low density can be used in lower weight percentages). Carbon/graphite containing coatings 96 will typically contain 25 percent by weight carbon/graphite particles 97. Corrosion-resistant polymers containing a plurality of electrically conductive filler particles are further described in U.S. Pat. No. 6,372,376 to Fronk et al, incorporated herein.

The polymeric coating 96 may be applied to the substrate surfaces 65, 67 in a number of ways, e.g., (1) electrophoretic deposition, (2) brushing, spraying or spreading, or (3) laminating or (4) powder coating. Powder coatings of polymeric substances are particularly preferred because they can be efficiently deposited with little waste, can coat surfaces with a pre-existing polymer layer, have less porosity, and can be deposited substantially uniformly in thicker layers than many other methods of polymer application. Powder coating is well known in the art and useful to coat a variety of conductive and non-conductive substrates by charging dry polymeric particles with voltages generally above 80 kV, as they exit a lined (e.g. Teflon®)) sprayer. A variety of polymers may be applied with this method, including without limitation, expoxies, polyamides, and polyimides. Also, electrophoretically deposited coatings 96 are advantageous because they can be quickly deposited in an automated process forming small amounts of waste, and can also be deposited substantially uniformly onto substrates having complex and recessed surfaces like those used to form the reactant flow fields on the working face(s) of the contact elements. Electrophoretic deposition is a well-known process useful to coat a variety of conductive substrates such as automobile and truck bodies. Cathodic epoxies, acrylics, urethanes and polyesters are useful by way of example with this method of electrophonetic deposition coating. Subsequent baking of the coated contact element 58, 60 cures, crosslinks, and densities the coating.

An alternative method of applying the polymeric coating is first forming the polymer as a discrete film (e.g. by solvent casting, extrusion, etc.), and then laminating onto the working surface 59, 63 of the contact element 58, 60, e.g., by hot rolling. The discrete film preferably contains a plasticizer to improve handling of the film in this method of application and provides a coating layer atop the substrate 58, 60 that is supple enough so that it can be readily shaped, (e.g., stamped) without tearing or disrupting the film when the contact element 58, 60 is formed as by stamping. Fluoro-elastomers such as polyvinylidiene diflouride or the like are useful with this embodiment, and may be used with conventional plasticizers such as dibutyl phthalate.

Alternatively, the polymer film 96 is applied to the working face 59, 63 of the substrate 58, 60 by spraying, brushing or spreading (e.g., with a doctor blade). A precursor of the coating is formed by dissolving the polymer in a suitable solvent, optionally, conductive filler particles 97 can be mixed with the dissolved polymer and applied it as a wet slurry atop the substrate 58, 60. The wet coating is then dried (i.e. the solvent removed) and cured as needed (e.g., for thermosets). The conductive particles 97, when present, adhere to the substrate 58, 60 by means of the solvent-free polymer.

A preferred polymer useful with this spraying, brushing, or spreading application comprises a polyamide-imide thermosetting polymer. The polyamide-imide is dissolved in a solvent comprising a mixture of N-methylpyrrolidone, propylene glycol and methyl ether acetate. To this solution is, optionally, added about 21% to about 23% by weight of a mixture of graphite and carbon black particles wherein the graphite particles range in size from about 5 µm to about 20 µm and the carbon black particles range in size from about 0.5 µm to about 1.5 µm with the smaller carbon black particles serving to fill the voids between the larger graphite particles and thereby increase the conductivity of the coating compared to all-graphite coatings. The mix is applied to the substrate 58, 60 dried and cured to about 15-30 µm thick coatings 96 (preferably about 17 µm) having a carbon-graphite content of about 38% by weight (if used). It may be cured slowly at low temperatures (i.e., <400° F.), or more quickly in a two step process wherein the solvent is first removed by heating for ten minutes at about 300° F.-350° F. (i.e., dried) followed by higher temperature heating (500° F.-750° F.) for durations ranging from about 30 seconds to about 15 minutes (depending on the temperature used) to cure the polymer.

The protective coating 94 of one aspect of the present invention may be achieved by various configurations of polymeric coatings 96 and passivation layers 95. According to a preferred embodiment of the invention, the entire surface 65, 67 of the bipolar plate 56 is passivated via anodization or a similar method, which may include a conversion coating process to form a passivation layer 95. The passivation layer 95 formed on the land areas of the bipolar plate 56, by the first step, is removed for example by mechanical abrasion. Then, the entire bipolar plate is then coated with a conductive polymeric layer which includes conductive particles dispersed throughout.

In one preferred embodiment, the passivation layer 95 is removed from the land area 64 only, and the passivation layer 95 remains on the channel or groove areas 66 of the bipolar plate. The removal of the passivation layer 95 from the land areas 64 only, allows for maximum electrical conductivity. The passivation layer 95 remaining in the channel or groove 66 areas allows for maximum corrosion resistance. Adding a polymeric coating layer 96 prevents the natural oxide from forming on the electrically active land areas 64. Formation of the natural oxide decreases the electrical conductivity of the bipolar plate 56.

Figure 5:
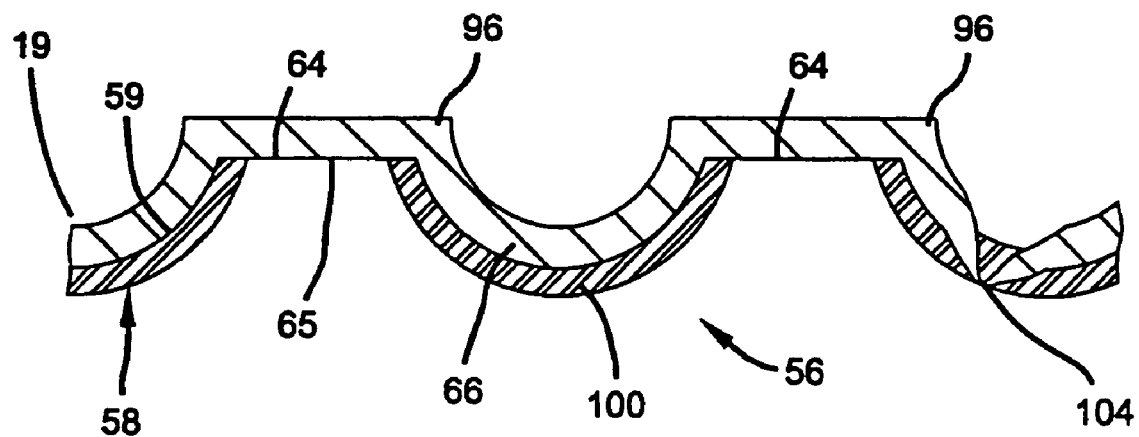
FIG. 5 is a partial cross-sectional view of a working surface of a preferred embodiment of the present invention showing a passivation layer, and the exemplary polymeric layer.

FIG. 5 shows a partial view of a bipolar plate 56, depicting one preferred embodiment of a single active side 19 of the first sheet 58. The working face 59 of the entire bipolar plate 56 is passivated via anodization or the like. The resulting first passivation layer 100 is then removed from the land areas 64 only via mechanical abrasion, chemical etching, or a similar method that would only remove the first passivation layer 100 from the land areas 64. Next, the entire bipolar plate 56 substrate surface 65 is coated with a corrosion resistant polymeric layer 96. Finally, the entire substrate surface 65 is passivated a second time. This second passivation treatment forms aluminum oxide at the site of any pinholes 104 (or uncovered regions on the substrate surface 65) in the underlying passivation layer 100 and corrosion resistant polymeric layer 96 to further minimize any corrosion of the plate 58.

Figure 6:
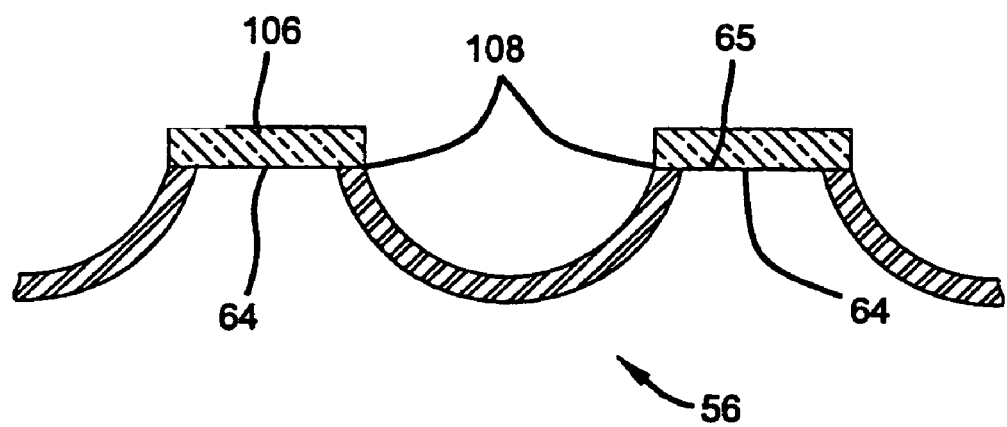
FIG. 6 is a partial cross-sectional view of the working surface of a preferred embodiment of the present invention showing a substrate with un-masked regions; masked regions, the polymeric layer, and the passivation layer.
Figure 7:
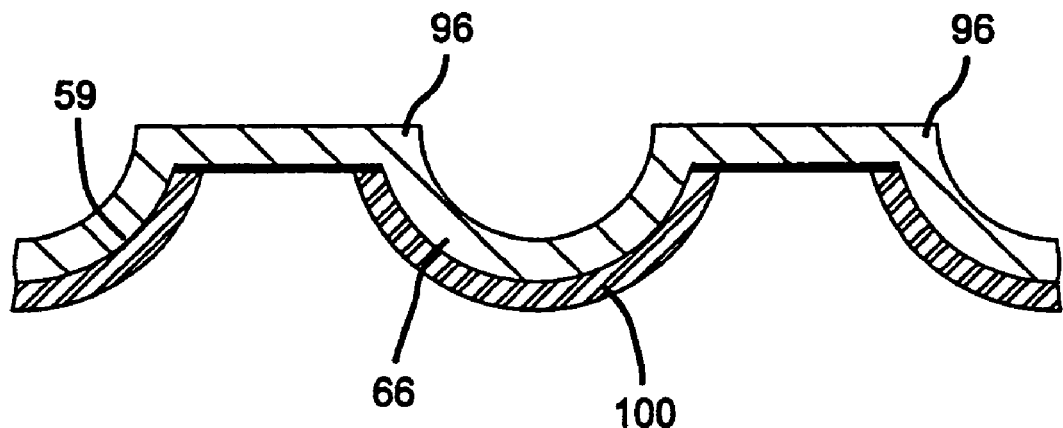
FIG. 7 is a partial cross-sectional view of the working surface of a preferred embodiment of the present invention with a partially removed layer of the working surface, the passivation layer, and the polymeric layer.

The flow fields or channels (i.e. lands 64 and grooves 66) are often formed by photochemically etching around masked areas, where the unmasked surfaces are removed to form the grooves or channels. According to another preferred embodiment of the present invention shown in FIG. 6, a bipolar conductive plate 56 has the etching mask 106 left on the substrate surface 65 so that the land areas 64 are not exposed to the subsequent passivation/treatment process. A mask is any material that is applied to the substrate and remains stable during passivation, and is generally made of opaque materials, such as photomasks. The unmasked portions of the bipolar plate 56 are passivated via anodization or the like. Following passivation, the etching mask 106 is removed from the bipolar plate 56. The land areas 64 (i.e. areas covered by a mask 106 during passivation) may have some passivation or oxide formation at the edges of the masking 108, so optionally, the land areas 64 may have any oxide present removed by mechanical abrasion, chemical etching, or a similar method. The entire bipolar plate 56 with grooves 66 formed by a masking process is then coated with a corrosion resistant polymeric layer 96, as in FIG. 7. This polymeric layer 96 may comprise conductive particles 97. This coated bipolar plate 56 may optionally be passivated a second time. This second passivation ensures that any remaining pinholes 104 in the coating 94 are passivated for stability from corrosion.

According to still another preferred embodiment of the invention, a bipolar plate 56 may be processed by removing a naturally existing oxide layer on the surface by mechanical, chemical or electrochemical means. The removal of natural oxides from the entire bipolar plate 56 substrate surface 65 ensures that the subsequent coating 94 will be adherent. A corrosion resistant polymeric sealing layer 96 is then applied. The polymeric sealing layer 96 may include electrically conductive particles 97 to enhance conductivity. The entire bipolar plate 56 working face surface 59 with a polymeric layer 96 is then passivated. This passivation step ensures that any remaining pinholes 104 through the polymeric coating 96 would be protected from corrosion providing a corrosion impermeable protective coating 94.

Figure 8:
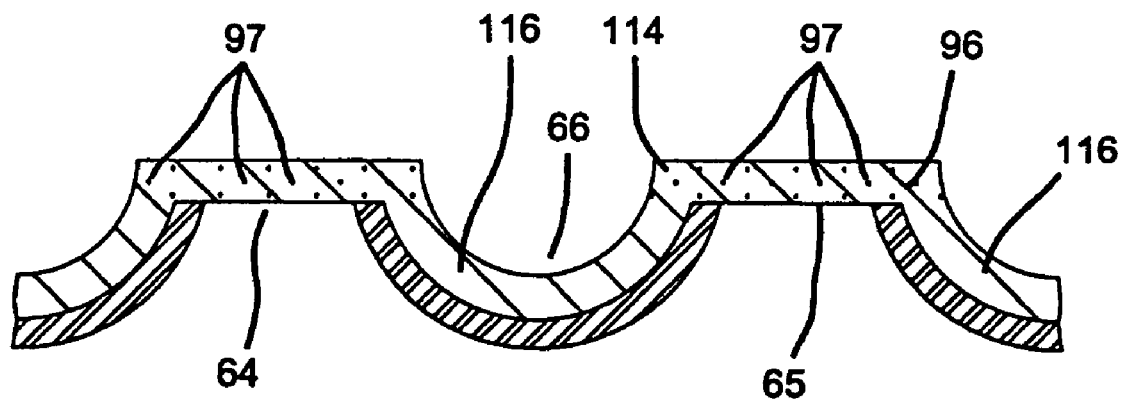
FIG. 8 is a partial cross-sectional view of the working surface of a preferred embodiment of the present invention showing the passivation layer, and a first polymeric layer without conductive particles applied in the grooves and a second polymeric layer with conductive particles applied on the lands.

Still yet another preferred embodiment includes a polymeric layer 96 applied according to any of the preferred embodiments above. However, conductive particles 97 are distributed in a matrix and applied only to the land areas 64 where electrical conductivity is paramount, as shown generally in FIG. 8. The interjacent grooves 66 or channels are coated in the corrosion-resistant polymeric matrix 96 without conductive particles 97, as enhanced conductivity in these regions is not crucial. Thus, essentially two distinct corrosion-resistant polymeric layers are applied, one polymer layer 114 with conductive materials 97 dispersed throughout to increase conductivity for the land 64 or electrical contact areas, and the other polymer layer 116 without conductive particles 97 applied primarily for protection of the underlying substrate 65. The polymer 116 in the grooves 66 may be applied at a greater thickness to enhance corrosion resistance in these regions, as may be appreciated by one of skill in the art. Further contemplated by the present invention, the polymer layer 116 may be different polymeric compositions applied in the grooves 66 than in the lands 64, where the first composition is selected to provide greater corrosion protection in the grooves 66 and the second composition affords greater conductivity on the lands 64 while still providing some corrosion resistance.

The invention provides the ability to coat aluminum with a conductive coating while overcoming problems with prior art coating porosity which provides corrosion sites on the aluminum that expand rapidly, thus attacking the underlying metal and decreasing the performance of the fuel stack.

While the invention has been described in the terms of specific embodiments thereof, it is not intended to be limited thereto but rather only to the extent set forth hereafter in the claims which follow.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of treating a separator plate having a surface with one or more gas distribution regions comprising the steps of:
    passivating the entire surface of the separator plate and then removing said passivation layer from areas between the gas distribution regions;
    applying a polymeric coating onto said surface of the separator plate where said polymeric coating is corrosion-resistant to thereby form a coated surface; and
    passivating any areas of the coated surface where any pinholes exist in said polymeric coating, to thereby passivate areas of the separator plate underlying said pinholes.

2. A method of treating a separator plate having a surface with one or more gas distribution regions, wherein the gas distribution regions are grooves in said surface of the separator plate and said grooves are interspersed between lands, comprising the steps of:
    applying a mask to said lands to protect said lands from passivation;
    passivating said grooves;
    applying a polymeric coating onto said surface of the separator plate where said polymeric coating is corrosion-resistant; and
    passivating any areas of the polymeric coating where any pinholes exist in said polymeric coating, to thereby passivate areas of the separator plate underlying said pinholes.

3. The method of claim 2 wherein directly after said passivating step which passivates said grooves, a further step of removing said mask from said lands, prior to said step of applying a polymeric coating.

4. A method of forming a separator plate comprising a substrate having a surface with a contour defined by a plurality of grooves interspersed between lands, said method comprising:
    (1) masking first regions of the substrate;
    (2) etching a pattern of grooves in second, unmasked regions of the substrate;
    (3) passivating said grooves of said second regions;
    (4) applying a polymeric coating onto the surface of the substrate; and
    (5) treating the substrate to passivate any areas of the substrate exposed by pinhole openings in the coating from the applying step.

5. The method of claim 4 including after step (3), removing the mask from said first regions.

6. The method of claim 5 including before step (4) and after said step of removing the mask, the further step of cleaning said first regions of the substrates to remove at least a portion of any oxides present thereon.

7. A method of treating a separator plate having a substrate, the method comprising:
    (1) cleaning a surface of the substrate to remove at least a portion of any oxides present thereon;
    (2) coating the substrate with an electrically conductive, corrosion-resistant polymeric layer;
    (3) treating the substrate to passivate any areas of the substrate exposed by pinhole openings in the electrically conductive, corrosion-resistant polymeric layer.

* * * * *